US011480115B1

(12) United States Patent
Svensson et al.

(10) Patent No.: US 11,480,115 B1
(45) Date of Patent: Oct. 25, 2022

(54) OPERATING STRATEGY MITIGATING UNDESIRED COMBUSTION IN DUAL FUEL ENGINE

(71) Applicant: Caterpillar Inc., Peoria, IL (US)

(72) Inventors: Kenth I Svensson, Peoria, IL (US); Eric Lee Schroeder, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/494,099

(22) Filed: Oct. 5, 2021

(51) Int. Cl.
| | | |
|---|---|---|
| *F02D 41/22* | (2006.01) | |
| *F02D 19/02* | (2006.01) | |
| *F02D 41/00* | (2006.01) | |
| *F02M 35/10* | (2006.01) | |
| *F02M 21/02* | (2006.01) | |
| *F02D 19/06* | (2006.01) | |
| *F02D 19/08* | (2006.01) | |

(52) U.S. Cl.
CPC ....... *F02D 19/021* (2013.01); *F02D 19/0602* (2013.01); *F02D 19/0642* (2013.01); *F02D 19/0689* (2013.01); *F02D 19/0692* (2013.01); *F02D 19/08* (2013.01); *F02D 41/0087* (2013.01); *F02D 41/22* (2013.01); *F02M 21/0203* (2013.01); *F02M 21/0278* (2013.01); *F02M 35/10157* (2013.01); *F02M 35/10216* (2013.01); *F02D 2200/024* (2013.01)

(58) Field of Classification Search
CPC ............... F02D 19/021; F02D 19/0602; F02D 19/0642; F02D 19/0689; F02D 19/0692; F02D 19/08; F02D 41/0087; F02D 41/22; F02D 2200/024; F02M 21/0203; F02M 21/0278; F02M 35/10157; F02M 35/10216
USPC ............ 123/90.15, 435, 436, 299, 300, 481, 123/198 F; 701/103–105, 110–111
See application file for complete search history.

(56) References Cited

U.S. PATENT DOCUMENTS

| | | | |
|---|---|---|---|
| 8,700,290 B2 * | 4/2014 | Miyamoto | ........ F02D 41/0085 123/674 |
| 9,631,572 B2 * | 4/2017 | Glugla | .............. F02D 41/403 |
| 9,988,991 B2 | 6/2018 | zur Loye et al. | |
| 10,060,872 B1 | 8/2018 | Potyrailo et al. | |
| 10,167,806 B2 * | 1/2019 | Surnilla | ............ F02D 41/0087 |
| 10,458,346 B2 | 10/2019 | Barta et al. | |
| 10,626,804 B2 | 4/2020 | Atterberry et al. | |
| 10,935,449 B2 | 3/2021 | Barta et al. | |

* cited by examiner

*Primary Examiner* — Hai H Huynh
(74) *Attorney, Agent, or Firm* — Brannon Sowers & Cracraft PC

(57) ABSTRACT

A method of operating a dual fuel engine includes conveying intake air, and a first fuel as a vapor and as a liquid, into a combustion cylinder in an engine, and directly injecting a second fuel into the combustion cylinder to form a first combustion charge of the first fuel as a vapor and as a liquid, the second fuel, and intake air. The second fuel is ignited to initiate combustion of the first combustion charge. Operating the dual fuel engine further includes varying at least one of, a vapor proportion of the first fuel or a total proportion of the first fuel, in a subsequent combustion charge to mitigate undesired combustion. The first fuel can include a liquid alcohol fuel. The second fuel can include a liquid compression-ignition fuel. Related apparatus and control logic is also disclosed.

20 Claims, 2 Drawing Sheets

OPERATING STRATEGY MITIGATING UNDESIRED COMBUSTION IN DUAL FUEL ENGINE

TECHNICAL FIELD

The present disclosure relates generally to operating a dual fuel engine system, and more particularly to varying at least one of a vapor proportion of a first fuel or a total proportion of a first fuel in a dual fuel engine system to mitigate undesired combustion.

BACKGROUND

Internal combustion engines are well-known worldwide for applications ranging from electrical power generation to land vehicle and marine vessel propulsion, in compressors, pumps, and for a multitude of industrial applications. Such engines can operate on a variety of different liquid fuels, gaseous fuels, and various blends. Spark-ignited engines utilize an electrical spark to initiate combustion of fuel and air, whereas compression-ignition engines typically compress gases in a cylinder to an auto-ignition threshold of a compression-ignition fuel. Dual fuel engines employ two different fuel types, commonly a gaseous fuel and a liquid fuel, combusted together in the engine cylinders. In a pilot-ignited dual fuel strategy, a relatively small amount of a pilot fuel is combusted in the cylinders to trigger ignition of a relatively larger main fuel quantity. Dual fuel strategies are well-known employing a liquid diesel fuel which is compression-ignited to initiate combustion of natural gas or another gaseous fuel. Engineering resources have been directed at exploring various different permutations of these general strategies over the years, including recent efforts to exploit various alternative fuel types such as liquid alcohol fuels.

In one known strategy, a liquid alcohol fuel such as methanol is delivered into a cylinder and ignited using a relatively small quantity of diesel fuel. Liquid alcohol fuel applications have yet to reach their full theoretical potential. Alcohol fuels tend to have a high latent heat of vaporization, making it challenging in some instances to vaporize liquid alcohol fuel to a desired extent. Alcohol fuel in liquid form can have various deleterious effects on engine operation and performance. Moreover, alcohol fuels are often difficult to employ at a desirably high substitution rate or ratio relative to comparable diesel engines. One example dual fuel engine and methodology is known from United States Patent Application Publication No. 20150226144A1 to Sixel et al.

SUMMARY

In one aspect, a method of operating an engine includes conveying intake air, and a first fuel as a vapor and as a liquid, into a combustion cylinder in an engine, and directly injecting a second fuel into the combustion cylinder to form a first combustion charge of the first fuel as a vapor and as a liquid, the second fuel, and intake air. The method further includes igniting the second fuel to initiate combustion of the first combustion charge, and determining an undesired combustion condition of the first combustion charge. The method further includes varying at least one of, a vapor proportion of the first fuel or a total proportion of the first fuel, in a subsequent combustion charge formed in the combustion cylinder, based on the undesired combustion condition.

In another aspect, an engine system includes an engine having a combustion cylinder formed therein, an upstream fuel injector arranged to inject a first fuel as liquid into a stream of compressed intake air conveyed from a compressor, and a downstream fuel injector arranged to inject the first fuel as liquid into a stream of the compressed intake air and the first fuel having vaporized conveyed to the combustion cylinder. The engine system further includes a direct fuel injector arranged to directly inject a second fuel into the combustion cylinder, and an undesired combustion sensor. The engine system further includes a fueling control unit coupled to the undesired combustion sensor. The fueling control unit is structured to determine an undesired combustion condition of a first combustion charge of the first fuel as liquid, the first fuel as vapor, the second fuel, and intake air in the combustion cylinder. The fueling control unit is further structured to vary, via control commands to at least one of the upstream fuel injector or the downstream fuel injector, at least one of a vapor proportion of the first fuel or a total proportion of the first fuel, in a subsequent combustion charge, based on the determined undesired combustion condition.

In still another aspect, a fuel system for an engine includes an upstream fuel injector structured to inject a liquid alcohol fuel into a stream of compressed intake air conveyed from a compressor, and a plurality of downstream fuel injectors each structured to inject the liquid alcohol fuel into a different stream of the compressed intake air and the liquid alcohol fuel having vaporized conveyed to one of a plurality of combustion cylinders in the engine. The fuel system further includes a fueling control unit structured to receive cylinder pressure data indicative of undesired combustion in at least one of the plurality of combustion cylinders, and to determine, based on the cylinder pressure data, an undesired combustion condition of the liquid alcohol fuel, the liquid alcohol fuel having vaporized, a compression ignition fuel, and the compressed intake air, in at least one of the plurality of combustion cylinders. The fueling control unit is further structured to output fuel injector control commands to vary at least one of a vapor proportion of the liquid alcohol fuel or a total proportion of the liquid alcohol fuel, based on the determined undesired combustion condition.

DETAILED DESCRIPTION

Figure 1:
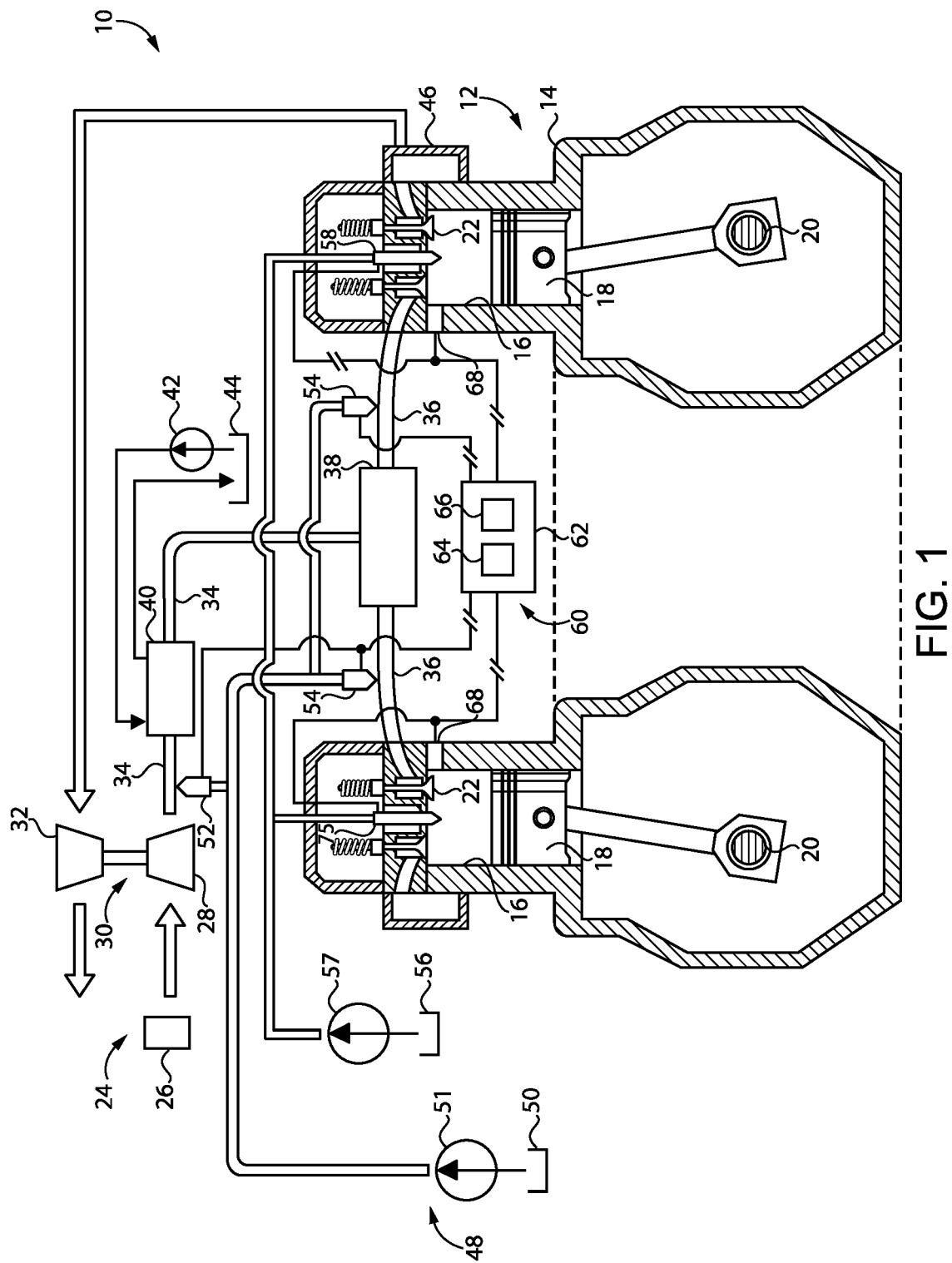
FIG. 1 is a diagrammatic view of an internal combustion engine system, according to one embodiment.

Referring to FIG. 1, there is shown an internal combustion engine system 10 according to one embodiment, and including an internal combustion engine 12 having an engine housing 14 with a plurality of combustion cylinders 16 formed therein. A plurality of pistons 18 are movable within combustion cylinders 16 between a top dead center position and a bottom dead center position to rotate a crankshaft 20 in a generally conventional manner. Combustion cylinders 16, hereinafter referred to at times in the singular, can be of any number and in any suitable arrangement such as an in-line pattern, a V-pattern, or still another. Engine valves 22 are supported in engine housing 14 and open and close to convey intake air, and as further discussed herein fuel, into combustion cylinders 16, and expel exhaust, typically although not necessarily in a conventional four-stroke pattern.

Engine system 10 and engine 12 further include an intake system 24 having a filtered air inlet 26, receiving a flow of fresh intake air which is conveyed to a compressor 28 in a turbocharger 30. A flow of exhaust from engine 12 rotates a turbine 32 of turbocharger 30 to rotate compressor 28. Intake system 24 further includes an intake conduit 34 structured to convey a stream of compressed intake air from compressor 28 in a downstream direction to engine 12. Intake runners 36 extend to combustion cylinders 16 from an intake manifold 38 fluidly connected to intake conduit 34. An aftercooler 40 cools compressed intake air, and in the illustrated embodiment is a liquid aftercooler coupled with a pump 42 operable to circulate a coolant through aftercooler 40 from a tank 44. The coolant used to cool aftercooler 40 could be an engine coolant carried onboard a machine powered by way of engine system 10. In a marine vessel application, for example, aftercooler 40 could be operated with seawater. In addition to marine vessel propulsion applications engine system 10 could be deployed for land vehicle propulsion, to power a pump or a compressor, for electrical power generation, or for any other purpose. Engine 12 further includes an exhaust manifold 46 receiving a flow of engine exhaust from combustion cylinder 16 and conveying the same to turbine 32.

Engine system 10 further includes a dual fuel system 48 having a first liquid fuel supply 50, and a pump 51 operable to convey a first liquid fuel from fuel supply 50 to an electrically actuated upstream fuel injector 52 and to a plurality of electrically actuated downstream fuel injectors 54. Additional pumps for pressurizing the first liquid fuel and/or one or more pressurized reservoirs for the first liquid fuel could be included in dual fuel system 48. As used herein the term "liquid fuel" refers to a fuel that assumes a liquid phase at standard temperature and pressure. Upstream fuel injector 52 may be arranged to inject the first liquid fuel as liquid into a stream of compressed intake air conveyed from compressor 28. Downstream fuel injectors 54 may be arranged to inject the first liquid fuel as liquid into a plurality of different streams of compressed intake air and the first liquid fuel having vaporized in intake conduit 34 each conveyed to a different one of combustion cylinders 16. "Having vaporized" means at least some of the first fuel is vaporized. Dual fuel system 48 may further include a second liquid fuel supply 56 and a pump 57 operable to convey a second liquid fuel to a plurality of direct fuel injectors 58 each arranged to directly inject a second fuel into combustion cylinder 16. Additional pumps for pressurizing the second liquid fuel and/or one or more pressurized reservoirs for the second liquid fuel could be included in fuel system 48.

In one embodiment, the first liquid fuel includes a liquid alcohol fuel, such as methanol, or a liquid alcohol fuel blend including multiple liquid alcohols, a liquid alcohol and a hydrocarbon fuel blend, or a liquid alcohol fuel and water blend, for example. The second liquid fuel can include a compression-ignition liquid fuel such as a diesel distillate fuel, a liquid hydrocarbon fuel with a cetane enhancer, or various others including blends. Pistons 18 may be movable within each respective combustion cylinder 16 to increase pressure therein to an auto-ignition threshold for auto-ignition of the second, compression-ignition liquid fuel to initiate combustion of a combustion charge in combustion cylinder 16.

In the illustrated embodiment upstream fuel injector 52 injects the first liquid fuel as liquid at an upstream delivery location. The upstream delivery location may include a compressor outlet delivery location in intake conduit 34, located, for example, downstream of compressor 28 and upstream of aftercooler 40. Injecting the first liquid fuel at the upstream delivery location enables the first liquid fuel to vaporize, at least in part, upon and/or after injection into the stream of relatively hot, compressed intake air. In some embodiments pump 42 can be operated to increase or decrease a flow of coolant, or the coolant temperature could be manipulated, to control or influence vaporization of the first liquid fuel injected at the upstream delivery location.

Downstream fuel injectors 54 may be operated to inject the first liquid fuel at downstream delivery locations into a stream of intake air and the first liquid fuel having been vaporized upon or after injection at the upstream delivery location. In the illustrated embodiment the downstream delivery location includes a port-injection delivery location in each of intake runners 36. In alternative embodiments a downstream delivery location could include a direct injection delivery location into combustion cylinder 16, or still another.

It will thus be appreciated that operating engine 12 can include conveying intake air, and the first liquid fuel as a vapor and as a liquid, into each combustion cylinder 16. Operating engine 12 can further include directly injecting the second liquid fuel into each combustion cylinder 16 to form a first combustion charge of the first liquid fuel as a vapor and as a liquid, the second liquid fuel, and compressed intake air. Igniting the second liquid fuel, such as by compression-ignition, initiates combustion of the first liquid fuel in vapor and in liquid form in the first combustion charge. As will be further apparent from the following description, engine system 10 may be uniquely configured to control the relative proportion of the first liquid fuel that is vaporized or a total proportion of the first liquid fuel in a subsequent combustion charge, to mitigate and in many instances eliminate various forms of undesired combustion.

To this end, engine system 10 further includes a control system 60. Control system 60 includes an electronic control unit 62 having a processor 64 and a computer readable memory 66. Processor 64 can include any suitable computerized device having a central processing unit (CPU) such as a microprocessor, a microcontroller, a field programmable gate array (FPGA), or any other programmable logic controller. Computer readable memory 66 can include any suitable memory such as RAM, ROM, DRAM, SDRAM, EEPROM, FLASH, or still another volatile or non-volatile memory. Control system 60 also includes an undesired combustion sensor 68 (hereinafter "sensor 68"), typically a plurality of undesired combustion sensors 68 each exposed to a fluid pressure of a different one of combustion cylinders 16 or otherwise associated therewith.

Sensor 68 produces data indicative of undesired combustion of a combustion charge in combustion cylinder 16. Thus, sensor 68 can produce data indicative of an undesired combustion condition of a first combustion charge of the first liquid fuel as a vapor and as a liquid, the second liquid fuel, and compressed intake air. An undesired combustion condition as contemplated herein can be associated with a variety of combustion properties or parameters that are observed or inferred during a combustion event. Examples of undesired combustion can include knock, pre-ignition, misfire, aggressive combustion, or a heat release rate time-shifted or otherwise different in any form from a target heat release rate.

In one practical implementation, sensor 68 includes an in-cylinder pressure sensor that produces cylinder pressure data of a respective combustion cylinder 16 during operating engine system 10. Control system 60 is configured to exploit the in-cylinder pressure data or other combustion data to mitigate undesired combustion of a subsequent combustion charge of the first liquid fuel as a vapor and as a liquid, the second liquid fuel, and intake air, combusted after a first combustion charge, as further discussed herein. In other embodiments, sensor 68 might include one or more knock sensors upon engine housing 14 and structured to monitor vibrations indicative of engine knock, for instance.

Electronic control unit 62 or "fueling control unit" 62 is coupled to sensor 68 to receive combustion data, such as cylinder pressure data, from sensor 68, and structured to determine an undesired combustion condition of the first combustion charge of the first liquid fuel as liquid, the first liquid fuel as vapor, the second liquid fuel, and intake air in each respective combustion cylinder 16. Fueling control unit 62 may be further structured to vary, via electronic control commands such as electrical control currents to at least one of upstream fuel injector 52 or any of the plurality of downstream fuel injectors 54, at least one of a vapor proportion of the first liquid fuel or a total proportion of the first liquid fuel in a subsequent combustion charge, based on the determined undesired combustion condition.

It will be recalled that the first liquid fuel injected at the upstream delivery location vaporizes at least in part upon or after injection such that the first liquid fuel having been vaporized is conveyed into each combustion cylinder 16. The first liquid fuel injected as a liquid at the downstream delivery locations may only partly vaporize, or not at all, and is conveyed into each respective combustion cylinder 16 as a liquid, serving to cool the incoming stream of compressed intake air and vaporized first liquid fuel. It will thus be appreciated that, at least at times, engine 12 is operating on the first liquid fuel in two different phases and the second liquid fuel.

It has been discovered that certain engine configurations and operating strategies can be associated with undesired combustion characteristics, particularly as substitution rates become relatively high, such as at or above about 60% substitution, at or above about 70%, or potentially still higher. In liquid alcohol dual fuel engines, it has also been observed that undesired combustion can limit the ability to optimally operate the engine at relatively high substitution rates. According to the present disclosure varying at least one of, a vapor proportion of the first liquid fuel or a total proportion of the first liquid fuel, can mitigate the undesired combustion, enabling operation to continue at or as close to a theoretical maximum substitution rate as is practical with manipulations of the vapor proportion or/and total proportion of alcohol fuel used to maintain combustion characteristics as desired.

It will thus be appreciated that the present disclosure can be understood to reduce undesired combustion in some instances by delivering a relatively higher proportion of the first liquid fuel in a vapor form. Reducing the relative amount of the first liquid fuel that is present for combustion in liquid form in-cylinder can, at least at times, bring combustion performance closer in line with optimal performance. In addition, the total proportion of the first liquid fuel, whether vapor or liquid, can be reduced to reduce a substitution rate of the first liquid fuel. At least under certain conditions reducing the substation rate of the first liquid fuel, thus reducing the total amount of fuel energy provided by the first liquid fuel for combustion, may bring combustion performance closer line with optimal performance.

In some instances, fueling control unit 62 may be structured to vary both the vapor proportion of the first liquid fuel and the total proportion of the first liquid fuel in a subsequent combustion charge. For instance, where undesired combustion is detected, fueling control unit 62 might bias delivery of the first liquid fuel partly or entirely to the upstream delivery location to provide relatively more of the first liquid fuel as vapor, while simultaneously reducing the total amount of the first liquid fuel that is being delivered, and compensating by increasing an amount of the second liquid fuel that is delivered to maintain an engine load level. Manipulation of the vapor proportion of the first liquid fuel and manipulation of the total proportion of the first liquid fuel could occur sequentially, in any order, in an effort to mitigate undesired combustion until an undesired combustion fault condition is cleared. One practical implementation includes responding to an undesired combustion condition by first increasing the vapor proportion, and then if unsuccessful in clearing an undesired combustion fault condition, responding by reducing the substitution rate. Another practical implementation includes responding to an undesired combustion condition by first reducing the substitution rate, and then if unsuccessful in clearing an undesired combustion fault condition, responding by increasing vapor proportion as described herein. Selection of an optimum strategy may depend upon engine load level, as described herein, or still other factors including the type of undesired combustion occurring. For example, in an instance where the undesired combustion condition is associated with engine knock, it might be desirable to reduce an amount of the first liquid fuel injected at the upstream delivery location and increase an amount of the first liquid fuel injected at the downstream delivery location so as to provide more of the first liquid fuel in liquid form into the combustion cylinder to cool the combustion charge. Those skilled in the art will envision still other ways in which dual fuel system 48 can be operated to maintain combustion in line with expectations for optimal performance.

Fueling control unit 62 may be further structured to determine a continuing undesired combustion condition. For example, after varying at least one of a vapor proportion or a total proportion of the first liquid fuel in a subsequent combustion charge, undesired combustion might continue to be observed or inferred. In this instance, where a continuing undesired combustion condition of the subsequent combustion charge is determined, fueling control unit 62 may deactivate the respective combustion cylinder 16 based on determining a continuing undesired combustion condition. This procedure can be thought of as fueling control unit 62 attempting to resolve undesired combustion by providing relatively more of the first liquid fuel as vapor, backing off the substitution rate of the first liquid fuel, or both, and, if unsuccessful, shutting down fuel delivery and thus operation of the poorly performing combustion cylinder altogether. In a related aspect, fueling control unit 62 might limit, including completely halting, injecting the first liquid fuel as liquid at the upstream delivery location while a combustion cylinder 16 is deactivated. Such a strategy can enable the still-activated combustion cylinders to operate at a higher load level potentially less susceptible to undesired combustion.

In this vein, it has further been observed that undesired combustion can differ based upon an engine load level. Those skilled in the art will be familiar with a coefficient of variability that can be associated with combustion in a dual fuel engine. In certain instances, the coefficient of variability can be more likely to exceed a desired target or target range at higher load levels, and particularly at higher substitution rates possibly due to the presence of a relatively large amount of liquid alcohol fuel in a given combustion charge. Accordingly, appropriate or optimal actions taken to mitigate undesired combustion can differ based upon engine load level. In some embodiments, fueling control unit 62 may be structured to perform the varying of at least one of vapor proportion of the first liquid fuel or total proportion of the first liquid fuel based on an observed engine load level. Those skilled in the art will be familiar with various ways in which engine load level can be determined by inference, estimation, or approximation. In some instances, it may be desirable to vary the vapor proportion by increasing the vapor proportion of the first liquid fuel when the engine is at a relatively higher load level. Thus, at higher engine loads an effort may be made to increase the relative proportion of the first liquid fuel that is injected at the upstream delivery location to enable relatively more of the first liquid fuel to be combusted in a combustion charge to be vapor. At lower engine loads, a different undesired combustion mitigation strategy might be used, such as reducing substitution rate, or something else altogether. The strategy discussed above where injecting the first liquid fuel at an upstream injection location is limited while one or more cylinders is deactivated may also be based on engine load level, for instance, applied where engine load level is relatively lower.

In combination with varying vapor proportion and/or total proportion of the first liquid fuel additional strategies such as advancing or retarding ignition timing might be used. Moreover, while selective apportionment of delivery of the first liquid fuel between the upstream delivery location and the downstream delivery location is one implementation, additional or alternative strategies for vaporizing relatively more or relatively less of the first liquid fuel prior to conveyance into a combustion cylinder, such as varying dissipation of heat to liquid coolant in aftercooler 40 might be employed.

INDUSTRIAL APPLICABILITY

Figure 2:
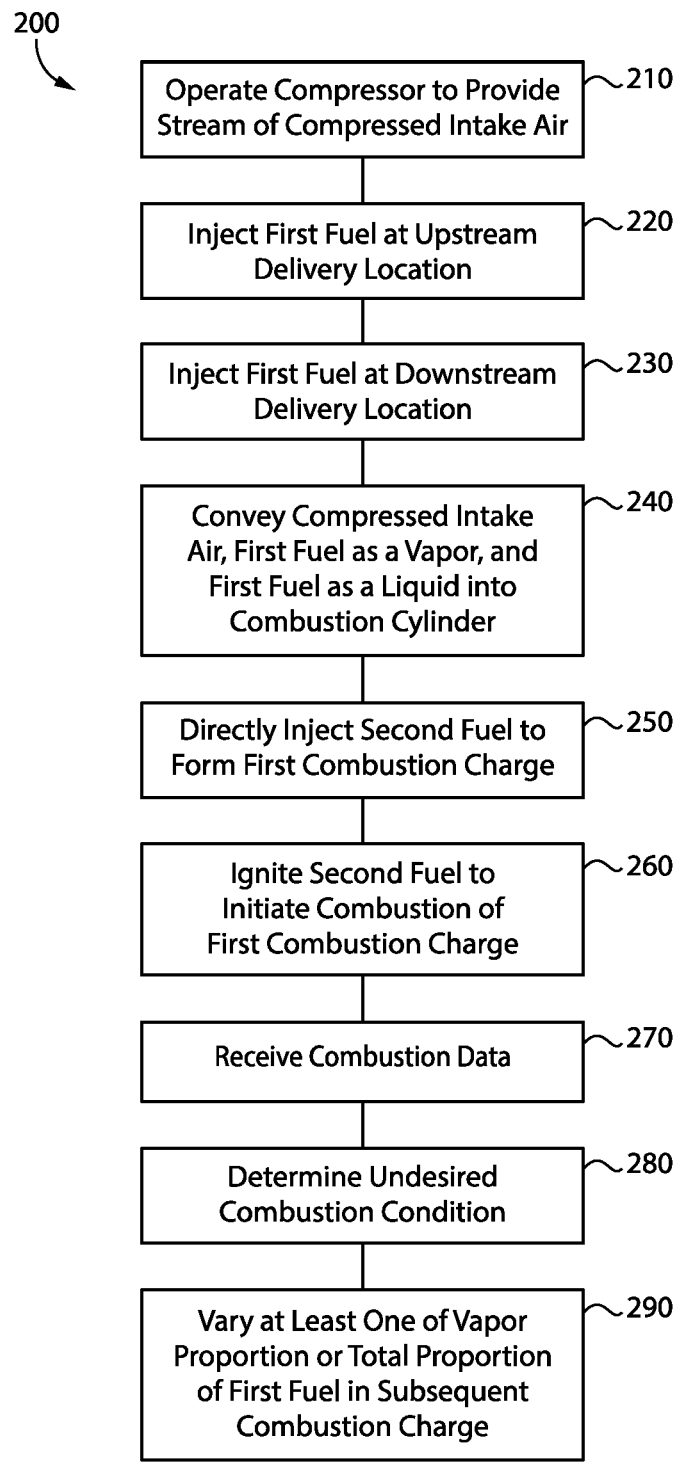
FIG. 2 is a flowchart of an example process and logic flow, according to one embodiment.

Referring also now to FIG. 2, there is shown a flowchart 200 illustrating example process and logic flow, according to one embodiment. In flowchart 200, at a block 210 compressor 28 is operated to provide a stream of compressed intake air for conveying to combustion cylinders 16. From block 210, flowchart 200 advances to a block 220 to inject the first liquid fuel at the upstream delivery location. From block 220 flowchart 200 advances to a block 230 to inject the first liquid fuel at the plurality of downstream delivery locations. Block 230 might be executed, at least at times, in parallel with block 220. From block 230, flowchart 200 advances to a block 240 to convey compressed intake air, the first liquid fuel as a vapor, and the first liquid fuel as a liquid, into combustion cylinder 16. From block 240, flowchart 200 advances to a block 250 to directly inject the second liquid fuel into combustion cylinder 16 to form the first combustion charge.

Upon injection of the second liquid fuel into combustion cylinder 16, the injected compression-ignition liquid fuel will typically begin to diffusion burn and thereby initiate combustion of the first liquid fuel in vapor and liquid form in combustion cylinder 16. From block 250, flowchart 200 advances to a block 260 to ignite the second liquid fuel and initiate combustion of the first combustion charge. From block 260, flowchart 200 advances to a block 270 to receive combustion data associated with combustion of the first combustion charge. It will be recalled that combustion data received by fueling control unit 62 may include in-cylinder pressure data but could additionally or alternatively include data of other combustion or engine operating parameters such as knock data produced by dedicated knock sensors attached to an outside of engine housing 14. From block 270, flowchart 200 advances to a block 280 to determine an undesired combustion condition of a first combustion charge as described herein.

It should be appreciated that in many engine cycles no undesired combustion condition might be determined. Determining an undesired combustion condition herein might include comparing in-cylinder pressure data to a stored model, determining a value from a map, performing a calculation, or by executing any other suitable logical process. From block 280, flowchart 200 advances to a block 290 to vary at least one of vapor proportion or total proportion of the first liquid fuel in a subsequent combustion charge. From block 290, flowchart 200 could loop back and execute again, or exit, for example.

It will also be recalled that the present disclosure contemplates determining a continuing undesired combustion condition of a subsequent combustion charge. Determining a continuing undesired combustion condition may include, for example, determining that an undesired combustion condition associated with the same phenomenon persists even after the varying of at least one of a vapor proportion or a total proportion of the first liquid fuel as in block 290. Determining a continuing undesired combustion condition could also include determining that a different undesired combustion event or characteristic has occurred or appears to have occurred. For example, a determined undesired combustion condition of a first combustion charge might be associated with knock, and after addressing the knock, in a subsequent combustion charge a determined undesired combustion condition might be associated with pre-ignition, misfire, or something else, with fueling control unit 62 varying at least one of vapor proportion of the first liquid fuel or total proportion of the first liquid fuel differently in the latter case versus the former case.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating an engine comprising:
conveying intake air, and a first fuel as a vapor and as a liquid, into a combustion cylinder in an engine;
directly injecting a second fuel into the combustion cylinder to form a first combustion charge of the first fuel as a vapor and as a liquid, the second fuel, and intake air;
igniting the second fuel to initiate combustion of the first combustion charge;

determining an undesired combustion condition of the first combustion charge; and varying at least one of, a vapor proportion of the first fuel or a total proportion of the first fuel, in a subsequent combustion charge formed in the combustion cylinder, based on the undesired combustion condition.

2. The method of claim 1 further comprising injecting the first fuel as liquid at each of an upstream delivery location and a downstream delivery location into a stream of intake air conveyed to the combustion cylinder.

3. The method of claim 2 further comprising monitoring in-cylinder pressure in the combustion cylinder, and wherein the determining an undesired combustion condition includes determining the undesired combustion condition based on the monitored in-cylinder pressure.

4. The method of claim 3 further comprising:
determining a continuing undesired combustion condition of the subsequent combustion charge; and
deactivating the combustion cylinder based on the determining a continuing undesired combustion condition.

5. The method of claim 4 wherein the combustion cylinder is one of a plurality of combustion cylinders in the engine, and further comprising limiting the injecting the first fuel as liquid at the upstream delivery location while the combustion cylinder is deactivated.

6. The method of claim 5 wherein the limiting the injecting the first fuel is performed based on a load level of the engine.

7. The method of claim 2 wherein the varying at least one of a vapor proportion of the first fuel or a total proportion of the first fuel includes increasing the vapor proportion by increasing a proportion of a total amount of the first fuel injected at the upstream delivery location.

8. The method of claim 2 wherein the upstream delivery location includes a compressor outlet delivery location in an intake conduit, and the downstream delivery location includes a port-injection delivery location in an intake runner.

9. The method of claim 1 wherein the first fuel includes a liquid alcohol fuel, and the second fuel includes a liquid compression-ignition fuel.

10. The method of claim 1 further comprising varying a total proportion of the first fuel in the subsequent combustion charge to reduce a substitution rate of the first fuel.

11. An engine system comprising:
a first liquid fuel supply;
a second liquid fuel supply;
an engine having a combustion cylinder formed therein;
an upstream fuel injector arranged to inject a first fuel from the first liquid fuel supply as liquid into a stream of compressed intake air conveyed from a compressor;
a downstream fuel injector arranged to inject the first fuel from the first liquid fuel supply as liquid into a stream of the compressed intake air and the first fuel having vaporized conveyed to the combustion cylinder;
a direct fuel injector arranged to directly inject a second fuel from the second liquid fuel supply into the combustion cylinder;
an undesired combustion sensor; and
a fueling control unit coupled to the undesired combustion sensor, and structured to:
determine an undesired combustion condition of a first combustion charge of the first fuel as liquid, the first fuel as vapor, the second fuel, and intake air in the combustion cylinder; and
vary, via control commands to at least one of the upstream fuel injector or the downstream fuel injector, at least one of a vapor proportion of the first fuel or a total proportion of the first fuel in a subsequent combustion charge, based on the determined undesired combustion condition.

12. The engine system of claim 11 wherein the undesired combustion sensor includes an in-cylinder pressure sensor.

13. The engine system of claim 11 wherein the fueling control unit is further structured to decrease a total proportion of the first fuel in the subsequent combustion charge to decrease a substitution rate of the first fuel, based on the determined undesired combustion condition.

14. The engine system of claim 11 wherein the fueling control unit is further structured to vary both the vapor proportion of the first fuel and the total proportion of the first fuel in the subsequent combustion charge.

15. The engine system of claim 11 further comprising a compressor within an intake conduit, and the upstream fuel injector is arranged to inject the first fuel at a compressor outlet delivery location of the intake conduit.

16. The engine system of claim 15 further comprising an intake runner extending between the intake conduit and the combustion cylinder, and the downstream fuel injector is arranged to inject the first fuel at a port-injection delivery location of the intake runner.

17. The engine system of claim 11 wherein the fueling control unit is further structured to determine a continuing undesired combustion condition, and to deactivate the combustion cylinder based on the determined continuing undesired combustion condition.

18. A fuel system for an engine comprising:
an upstream fuel injector structured to inject a liquid alcohol fuel into a stream of compressed intake air conveyed from a compressor;
a plurality of downstream fuel injectors each structured to inject the liquid alcohol fuel into a different stream of the compressed intake air and the liquid alcohol fuel having vaporized conveyed to one of a plurality of combustion cylinders in the engine;
a plurality of direct fuel injectors arranged to inject a compression-ignition fuel directly into each of the plurality of combustion cylinders in the engine; and
a fueling control unit structured to:
receive cylinder pressure data indicative of undesired combustion in at least one of the plurality of combustion cylinders;
determine, based on the cylinder pressure data, an undesired combustion condition of the liquid alcohol fuel, the liquid alcohol fuel having vaporized, the compression-ignition fuel, and the compressed intake air, in at least one of the plurality of combustion cylinders; and
output fuel injector control commands to vary at least one of a vapor proportion of the liquid alcohol fuel or a total proportion of the liquid alcohol fuel, based on the determined undesired combustion condition, and to directly inject a.

19. The fuel system of claim 18 wherein the fueling control unit is further structured to decrease a total proportion of the liquid alcohol fuel to decrease a substitution rate of the liquid alcohol fuel.

20. The fuel system of claim 18 wherein the fueling control unit is further structured to increase the vapor proportion by increasing a proportion of a total amount of the liquid alcohol fuel injected via the upstream fuel injector.

* * * * *